(12) United States Patent
Abe et al.

(10) Patent No.: US 8,140,301 B2
(45) Date of Patent: Mar. 20, 2012

(54) METHOD AND SYSTEM FOR CAUSAL MODELING AND OUTLIER DETECTION

(75) Inventors: Naoki Abe, Rye, NY (US); David L. Jensen, Peekskill, NY (US); Srujana Merugu, Sunnyvale, CA (US); Justin Wai-Chow Wong, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 11/742,227

(22) Filed: Apr. 30, 2007

(65) Prior Publication Data
US 2008/0270088 A1    Oct. 30, 2008

(51) Int. Cl.
*G06F 17/10* (2006.01)
*G06F 15/18* (2006.01)
(52) U.S. Cl. .................. 703/2; 706/15; 706/25
(58) Field of Classification Search ........ 703/2; 706/15, 706/25
See application file for complete search history.

(56) References Cited

U.S. PATENT DOCUMENTS

| | | | |
|---|---|---|---|
| 6,879,973 B2 * | 4/2005 | Skaanning et al. | 706/52 |
| 2004/0260664 A1 * | 12/2004 | Thiesson et al. | 706/21 |
| 2005/0216496 A1 * | 9/2005 | Chickering | 707/101 |
| 2006/0161592 A1 * | 7/2006 | Ertoz et al. | 707/200 |

OTHER PUBLICATIONS

Chow, et al., "Approximating Discrete Probability Distributions with Dependence Trees", IEEE Transactions on Information Theory, vol. IT-14, No. 3, May 1968, pp. 462-467.

* cited by examiner

*Primary Examiner* — Paul Rodriguez
*Assistant Examiner* — Andre Pierre Louis
(74) *Attorney, Agent, or Firm* — McGinn Intellectual Property Law Group, PLLC

(57) ABSTRACT

A method (and system) for causal modeling includes modeling a data set. The modeling includes estimating a reverse Bayesian forest for the data set and detecting outliers in a separate data set. Detecting the outliers includes applying the reverse Bayesian forest to the separate data set to obtain a probability value assigned to data points in the separate data set and identifying outliers in the separate data set by evaluating the probability value given by the reverse Bayesian forest.

16 Claims, 11 Drawing Sheets

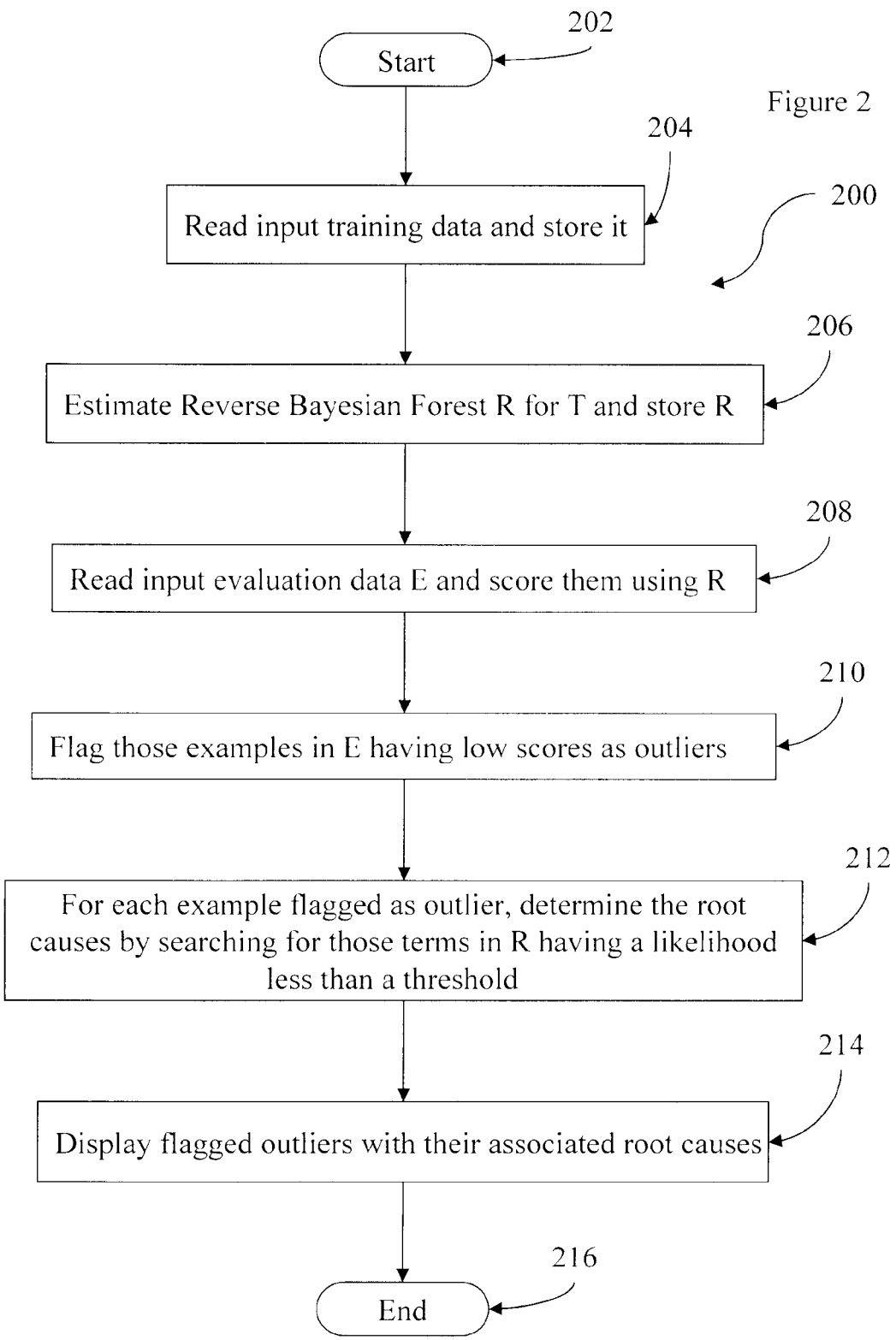

| Provider ID | Outlier score | Root cause features |
|---|---|---|
| 900471 | 489.0354 | FBG334v.FBG020v |
| 1552142 | 412.0596 | FBG007v.FBG334v |
| 1127121 | 407.8774 | FD0010v.FC0164v |
| 1584682 | 386.9634 | FD0001v.DERIVEDs |
| 594347 | 362.7302 | FBG163v.FD0001v |
| 618031 | 345.6269 | OBG019v.FC0172v |
| 1194185 | 286.993 | FBG007v.FBG334v |
| 1720945 | 269.8389 | FD0003v.FBG164v |
| 1636381 | 261.498 | FBG039v.FC0039v |
| 1254088 | 259.6855 | FBG019v.FD0006v |
| 2407664 | 255.7383 | FD0001v.DERIVEDs |
| 1827010 | 250.9291 | EXPOSUREs:FBG007v |
| 1144028 | 250.5948 | FD0006v.FBG003v |

Figure 6

METHOD AND SYSTEM FOR CAUSAL MODELING AND OUTLIER DETECTION

BACKGROUND OF THE INVENTION

1. Field of the Invention

The present invention generally relates to a system and method for causal modeling and outlier detection. More particularly, the present invention relates to a system and a method for causal modeling and outlier detection using a novel sub-class of Bayesian Networks, which is hereinafter called "Reverse Bayesian Trees", or synonymously a "Reverse Bayesian Forest".

2. Description of the Related Art

The data that is available for many application domains are often lacking in label information. Label information provides an indication of whether each datum possesses a certain property of interest, such as, for example, being fraudulent, being faulty, or the like.

Even in cases where a limited amount of label information is available, more often than not, the labeled data are scarce. Exemplary applications having data which may exhibit this property include, for example, fraud detection, tool anomaly detection, network intrusion detection, and the like.

For the reasons stated above, conventional solutions that rely on labeled data are often not applicable in practice. Recently, alternative solutions to this problem, which rely on outlier detection methods that detect and flag unusual patterns in data, have drawn considerable attention. The majority of these methods, however, have relied upon nearest-neighbor type modeling and detection schemes, which are not capable of providing a useful explanation of why the flagged outliers are judged to be outliers.

One promising approach to addressing this issue of providing an effective outlier detection method with a useful explanation is to apply modeling methods that use Bayesian networks. (See, for example, Heckerman, David, "A Tutorial on Learning with Bayesian Networks", in "Learning in Graphical Models, Jordan, M., editor, MIT Press, Cambridge, Mass., 1999.) A Bayesian network is a directed acyclic graph of nodes representing variables and arcs representing probabilistic dependency relations among the variables. However, this approach of using Bayesian Network estimation for the purpose of outlier detection has not been extensively pursued in the past, except in isolated cases, due to the high computational complexity required for estimation of Bayesian Networks. This is in part due to the fact that a search for a near optimal network structure within given data tends to require an amount of computation which is exponential or more than exponential in the number of variables in question, and this is often prohibitive in practical applications. For this reason, using an estimation procedure for the entire, unrestricted class of Bayesian networks for the purpose of causal modeling and outlier detection based upon data analysis performed on a large scale data set is not practical, and it is necessary that some restriction be placed on the class of networks to consider in the modeling process.

A representative method achieves computationally efficient modeling and outlier detection by restricting its attention on a sub-class of Bayesian networks called the "Chow-Liu expansions" (also known as "dependency trees"), (see, for example, Chow, C., and Liu, C. 1968, "Approximating discrete probability distributions with dependence trees", IEEE Transactions on Information Theory, 14(11):462-467.) While this method is efficient and has been applied in a number of practical applications, it suffers from the shortcoming that the subclass is not very expressive. More concretely, it is only able to capture dependency relations between two variables at a time, which in some applications may prove undesirable. This issue is particularly pressing in view of the fact that one of the most effective methods to determine causal dependency relations between variables requires that the relationship between three or more variables be observed.

SUMMARY OF THE INVENTION

In view of the foregoing and other exemplary problems, drawbacks, and disadvantages of the conventional methods and structures, an exemplary feature of the present invention is to provide a method and structure in which the goals of computationally efficient processing and relatively rich expressive power are simultaneously met.

In a first exemplary aspect of the present invention, a method for causal modeling includes modeling a data set using a reverse Bayesian forest.

In a second exemplary aspect of the present invention, a system includes a data storage module storing a data set, and a model estimation module in communication with the data storage module that models the data set as a reverse Bayesian forest.

In a third exemplary aspect of the present invention, a program for causal modeling includes instructions for receiving a data set and instructions for modeling the data set using a reverse Bayesian forest.

An exemplary embodiment of the present invention models data using a novel structure that is referred to as a "reverse Bayesian forest." A reverse Bayesian forest is a Bayesian Network in which the associated graphical structure is restricted to a set of tree structures, in each of which the direction of the edges leads from the root of the tree towards the leaves of the tree. The rest of the definition is identical to the general Bayesian Networks or any subclass thereof. That is, a set of directed edges from variables, say y, z, to a variable x, represents the conditional probability density of x given y and z. With the inventive method, it is possible to represent the conditional probability density using a number of statistical model classes. For example, when the variables are real valued variables, linear Gaussian models can be used to represent the conditional densities corresponding to the edges in the graph.

As is understood by those of ordinary skill in the art a Bayesian network is defined as a graph over the set of variables. A graph is defined as a set of nodes and a set of edges between them, and may have multiple connected components, such as multiple trees. Therefore, for the purpose of this application it is to be understood that a reverse Bayesian forest is a single Bayesian network. A Bayesian Network may be used to summarize the probabilistic dependencies that exist between a given set of variables. Say, for example, a set is x1, x2, x3 and x4. Suppose that a system recognizes dependency between x1 and x2, and between x3 and x4, but not across {x1,x2} and {x3,x4}, then the inferred Bayesian Network may consist of 2 (directed) edges x1->x2 and x3->x4. This would be a reverse Bayesian forest consisting of two trees, with the appropriate models of conditional densities p(x2|x1) and p(x4|x3) associated with the directed edges, but is a single network capturing the dependency structure between the four variables. It is actually different conceptually from two Bayesian networks—one consisting of x1->x2, and another consisting of x3->x4. Therefore, those of ordinary skill in the art understand that in this sense, a reverse Bayesian forest is not just a plurality of reverse Bayesian trees. Rather, it is a single Bayesian network representing the probability distribution over the set of all variables in question, x1, ..., x4 in the above example, and not two distinct representations of the distribution.

Further, for each leaf node of any reverse Bayesian tree in a given set of reverse Bayesian trees, a model of unconditional density is to be associated. For example, a Gaussian model can be used to represent the unconditional probability density of a leaf variable, if it is a real valued variable. Given the models of conditional probability densities for all of its edges, as well as the unconditional probability densities for the leaf nodes, the entire model represents the joint probability density for all of the variables, as the product of the conditional densities of all its edges and the unconditional probability density of the leaf nodes, in each reverse Bayesian tree.

An exemplary embodiment of the present invention performs causal modeling by estimating a nearly optimal reverse Bayesian forest for a given data set. It can then use the estimated model to detect outliers in a possibly separate data set, by applying the obtained reverse Bayesian forest model and obtaining likelihood scores for the data points in the given data set, and then determining and flagging those data points having low likelihood scores as the "outliers." Here, the likelihood score given by the reverse Bayesian forest to a data point may correspond to a probability assigned to the data point by it.

An exemplary embodiment of the present invention may use the method that is illustrated by the flowchart in FIGS. 3a-3b, as an estimation procedure. This estimation procedure finds a nearly optimal reverse Bayesian forest for a given data set. The method in the flowchart of FIGS. 3a-3b attempts to find a nearly optimal model within a class of reverse Bayesian trees for the given data, in the sense that the reverse Bayesian forest and its associated probability models has a "score" close to the best score among all of the reverse Bayesian forests. The score here can be supplied by a number of scoring functions that adhere to certain mathematical constraints. A representative scoring function is the likelihood. Another popular scoring function is called the data description length. With respect to either of these scoring functions, the method attempts to output a reverse Bayesian forest with a nearly best score from among all reverse Bayesian forests. With respect to the likelihood scoring function, the model with the best score corresponds to the one having the "maximum likelihood," that is: a model that is most likely to have given rise to the input data, in the sense commonly understood by those of ordinary skill in the art of Bayesian statistics.

An exemplary embodiment of a method of the present invention may be flexibly modified so as to output a nearly best model with respect to a number of scoring functions that generalize the likelihood function, in order to penalize more complex models. Such scoring functions are known to possess certain desirable statistical properties, such as that of consistency and convergence.

An exemplary embodiment of the present invention may provide additional information on the data records it flags as outliers that may not be provided by conventional outlier detection methods. More specifically, it may provide "root cause feature dependencies" for the outliers, that is, the dependencies between the features or variables that are violated with some degree of severity in the flagged records, and thus are responsible for them being judged as outliers.

An exemplary embodiment of the present invention may be applied to fraud detection systems and/or tool anomaly detection systems.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 2 illustrates a flowchart 200 of an exemplary embodiment of a method in accordance with the present invention;

FIG. 6 illustrates an output list 600 of outliers and their associated root causes in an application for detecting fraud in medical insurance in accordance with an exemplary embodiment of the present invention;

DETAILED DESCRIPTION OF EXEMPLARY EMBODIMENTS OF THE INVENTION

Figure 1:
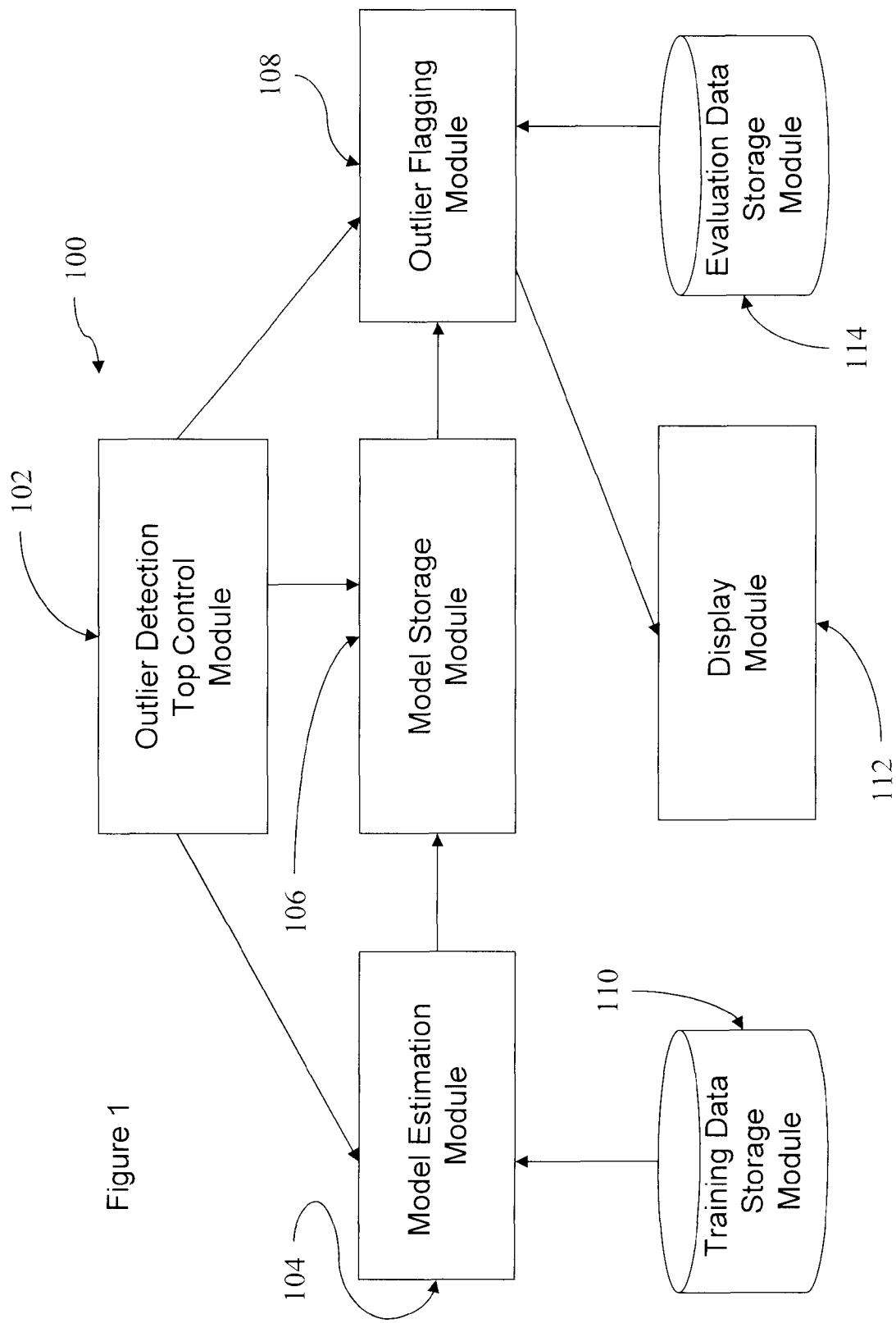
FIG. 1 illustrates an exemplary embodiment of a system 100 in accordance with the present invention.

Referring now to the drawings, and more particularly to FIGS. 1-10, there are shown exemplary embodiments of the method and structures of the present invention.

FIG. 1 illustrates an exemplary embodiment of a system 100 in accordance with the present invention. The system 100 includes an outlier detection top control module 102, a model estimation module 104, a model storage module 106, an outlier flagging module 108, a training data storage module 110, a display module 112, and an evaluation data storage module 114. The outlier detection control module 102 controls the entire flow of the modeling and outlier detection process. The model estimation module 104 estimates the reverse Bayesian forest based upon the data stored in the training data storage module 110 in accordance with the method illustrated by, for example, the flowchart 300 in FIGS. 3a and 3b. The model storage module 106 receives the model from the model estimation module 104 and stores the model. The outlier flagging module 108 receives the model from the model storage module 106 and flags the outliers in the model.

The outlier flagging module 108 performs the analysis based upon evaluation data that is stored in the evaluation data storage module 114. The display module 112 then displays the model and the flagged outliers to a user.

The system 100 executes the exemplary method that is illustrated by the flowchart 200 of FIG. 2. The method starts at step 202 and continues to step 204 where the training data storage module 110 reads and stores the training data. The method continues to step 206 where the model estimation module 104 estimates a reverse Bayesian forest based upon the training data and the model storage module 106 stores the reverse Bayesian forest. Next, in steps 210 and 212, the outlier flagging module 108 flags the examples in the evaluation data storage module 114 that have low scores as outliers and, for each flagged outlier, the module 108 determines the root causes by searching for those terms in the reverse Bayesian forest having a likelihood that is less than a predetermined threshold. The method continues to step 214, where the display module 112 displays the flagged outliers with their associated root causes in step 214 and continues to step 216 where the method ends.

An exemplary embodiment of the present invention provides an efficient estimation method for a subclass of Bayesian networks that is called "reverse Bayesian trees," or equivalently, a "reverse Bayesian forest." The method estimates a joint probability density that has given rise to the input data, represented as a reverse Bayesian forest. In its process of estimating the model, it estimates both the structure of a reverse Bayesian forest model, and the associated probability parameters.

A reverse Bayesian forest may include a number of reverse Bayesian trees for disjoint subsets of the set of variables for which the input data represent assumed values, where each reverse Bayesian tree represents a joint density over a high-dimensional space as a tree-structured product of conditional densities which may, for example, be described by equation (1) below:

$$P(x1,x2,x3,x4,x5,x6)=P(x1|x2,x3)*P(x2|x4,x5)*P(x3|x6)*P(x4)*P(x5)*P(x6) \quad (1)$$

Note that in equation (1), P(x1,x2,x3,x4,x5,x6) represents the joint density over six variables, x1 through x6, and is represented as the product of various terms representing conditional or unconditional densities of some subsets of these variables. For example, P(x1|x2,x3) represents the conditional density of x1, given x2 and x3, and P(x4) represents the unconditional density of x4.

In the above description, the exact nature of the conditional or unconditional density such as P(x1|x2, x3) is unspecified. An exemplary embodiment of the present invention may use any standard class of statistical models of probability density functions to represent these terms, depending on the nature of the application. When the variables are continuous real-valued variables, it may use linear Gaussian models to represent them. For example, the conditional density P(x1|x2, x3) may be represented as a linear Gaussian model of equation (2) below, where N(c, $\sigma^2$) denotes the Gaussian distribution with mean c and variance $\sigma^2$, and a1, b2, b3 and $\sigma^2$ are real-valued parameters of the model and are to be estimated from the input data:

$$P(x1|x2,x3)=N(a1+b2*x2+b3*x3,\sigma^2) \quad (2)$$

More generally, if $\pi(x)$ is the set of variables on which x is conditionally dependent, then:

$$P(xi|\pi(xi))=N(ai+\Sigma_{xj\in\pi(xi)}bj*xj,\sigma_i^2) \quad (3)$$

An exemplary embodiment of the present invention detects outliers using an estimated reverse Bayesian forest model. This embodiment flags outliers based upon the likelihood given by the estimated model to the records in the test data given to the embodiment for detecting outliers. The likelihood given to a test record, x, by the model may be the value of P(x), computed using the estimated model according to an equation akin to that given in equation (1) above, but is specific to the estimated model.

An exemplary embodiment of the present invention may provide additional information on the data records that it flags as outliers that may not be provided by conventional outlier detection methods. More specifically, it may provide the "root cause feature dependencies" for the outliers, that is, the dependencies between the features or variables, which are violated with some degree of severity in the flagged records, and, thus, are responsible for them being judged as outliers. For example, on a test record assuming concrete values for the variables x1 through x6, it may be judged that the record is assigned an exceptionally low likelihood value by the estimated model, that is P(x1,x2,x3,x4,x5,x6) is lower than usual, and in particular, lower than a certain threshold. It may further be judged that the term P(x1|x2,x3) is mainly responsible for this, namely the value of P(x1|x2,x3) assigned by the model to the relevant part of the test record, i.e. x1, x2 and x3, is exceptionally lower than a certain threshold. If such is the case, then the inventive method may provide "x1|x2,x3" as the root cause feature dependency relation for the record x flagged as an outlier.

The causal modeling problem considered herein using the Reverse Bayesian forests may be loosely defined as finding the "best" Bayesian network (i.e., structure and conditional probability distributions) that contains a reverse tree rooted at one of the variables, and satisfies a certain specified constraint on the non-existence of edges between some of the variables, which are called "causality constraints," or equivalently "ordering constraints." For example, it may be known from the domain knowledge specific to an application problem that a certain variable x could not causally depend on a certain other variable y. If such is the case, it is possible to give the condition that a directed edge from y to x should not be present in the tree structure of the model to be estimated, or equivalently, that there be no conditional density term for x, containing y as one of the conditional variables. A set of such prohibited edges will be referred to as causality constraints.

Let x1, ..., xn be n interacting factors such that x1 is the specified target variable. Let S={(x11,x12), ..., (xr1,xr2)} be the causality constraints such that in each ordered pair, the second variable can never be a cause of the first one so that the complement of S is the set of all allowed causality relations. We define the set of allowed causality relations as the set of "eligible" relations.

Let T be any Bayesian network (directed acyclic graph) consisting of n nodes corresponding to the variables x1, ..., xn. The quality of any such network is usually expressed in terms of a Bayesian network scoring criterion such as log-likelihood, all of which can be expressed in the form:

$$J(T)=\Sigma_i C(xi;\pi(xi)) \quad (4)$$

where:

$\pi(xi)$ denotes the Bayesian parents of the node xi; and $C(xi;\pi(xi))$ is the contribution of node xi to the cost function, optimized over the set of all conditional probability distributions under consideration, such as all those expressible as linear Gaussian models.

As the cost function is already optimized over the conditional distributions, the following description focuses on learning the optimal structure for the Bayesian network.

For a class of reverse Bayesian forest, the structure learning problem can be posed as that of finding the forest of directed trees on nodes $\{x1, \ldots, xn\}$ such that the quality measure $J(T)$ defined above is optimized, i.e.:

$$T^* = \mathrm{argmin}_{T \in Valid} J(T) = \mathrm{argmin}_{T \in Valid} \Sigma_i C(xi; \pi(xi)) \quad (5)$$

where:

$\pi(xi)$ are now interpreted as children of node $xi$; and

Valid is the set of all forests that satisfy the ordering constraints.

For the remainder of the detailed description, the terms "parents" and "children" are used in the context of directed trees so that they refer to Bayesian children and parents, respectively.

When the number of children (Bayesian parents) is restricted to one, the problem reduces to a minimum weighted spanning tree problem and can be readily solved using efficient methods, such as, for example, Kruskal's method. (See, for example, J. B. Kruskal, On the shortest spanning subtree and the traveling salesman problem. In Proceedings of the American Mathematical Society. 7 (1956), pp. 48-50.) However, the output models of such methods have limited expressive power. Hence, the inventors considered a more general case where each node is allowed to have at most a finite number of children (Bayesian parents), i.e., the feasible set is redefined to only allow graphs where the out-degree of each node is at most k.

To solve the structure learning problem for this subclass of Bayesian Networks, that is to find an optimal or near-optimal reverse Bayesian forest structure for the given input data, the inventors invented a novel approach. The approach begins with a forest of trees and repeatedly merges at most k+1 trees using the "best" possible combinations of parent-child relations while ensuring that none of the specified causality constraints are violated and remains the root of the tree containing it.

To make this more precise, these combinations are called "edge sets" and may be defined as follows. An edge set e is a set of parent-child relations $\{(x1; \pi(x1)), (x2; \pi(x2)), \ldots, (xr; \pi(xr))\}$ such that $\Sigma_i |\pi(xi)| \leq k$ and there are no cycles in e. For each merge, the "best" edge-set is determined by the net decrease in the quality cost function due to the addition of e, which is given by $\Sigma_i C(xi; \pi(xi))$.

Figure 3A:
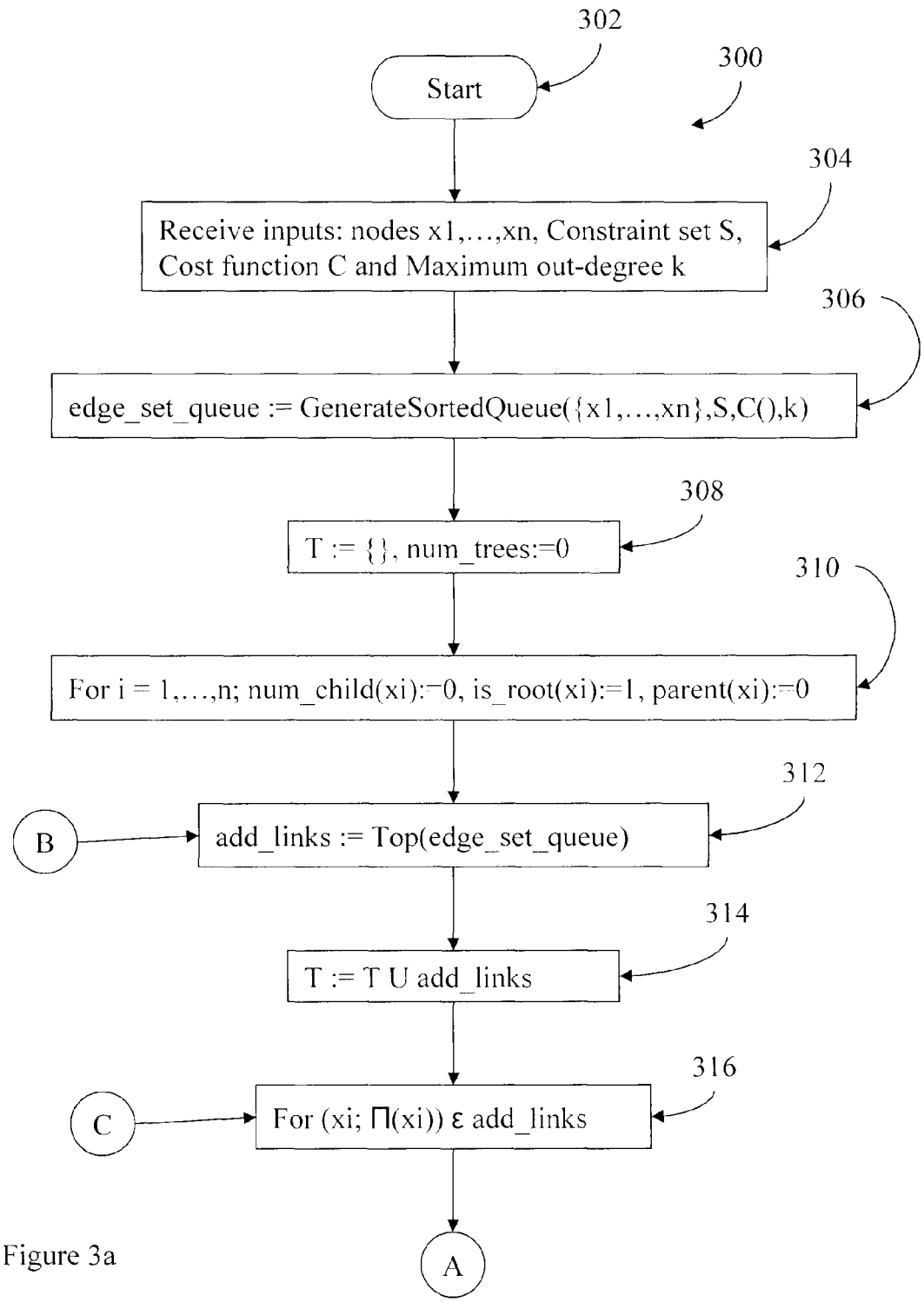
FIGS. 3a and 3b illustrate a flowchart 300 of an exemplary method for estimating a model of a reverse Bayesian forest in accordance with the present invention.
Figure 3B:
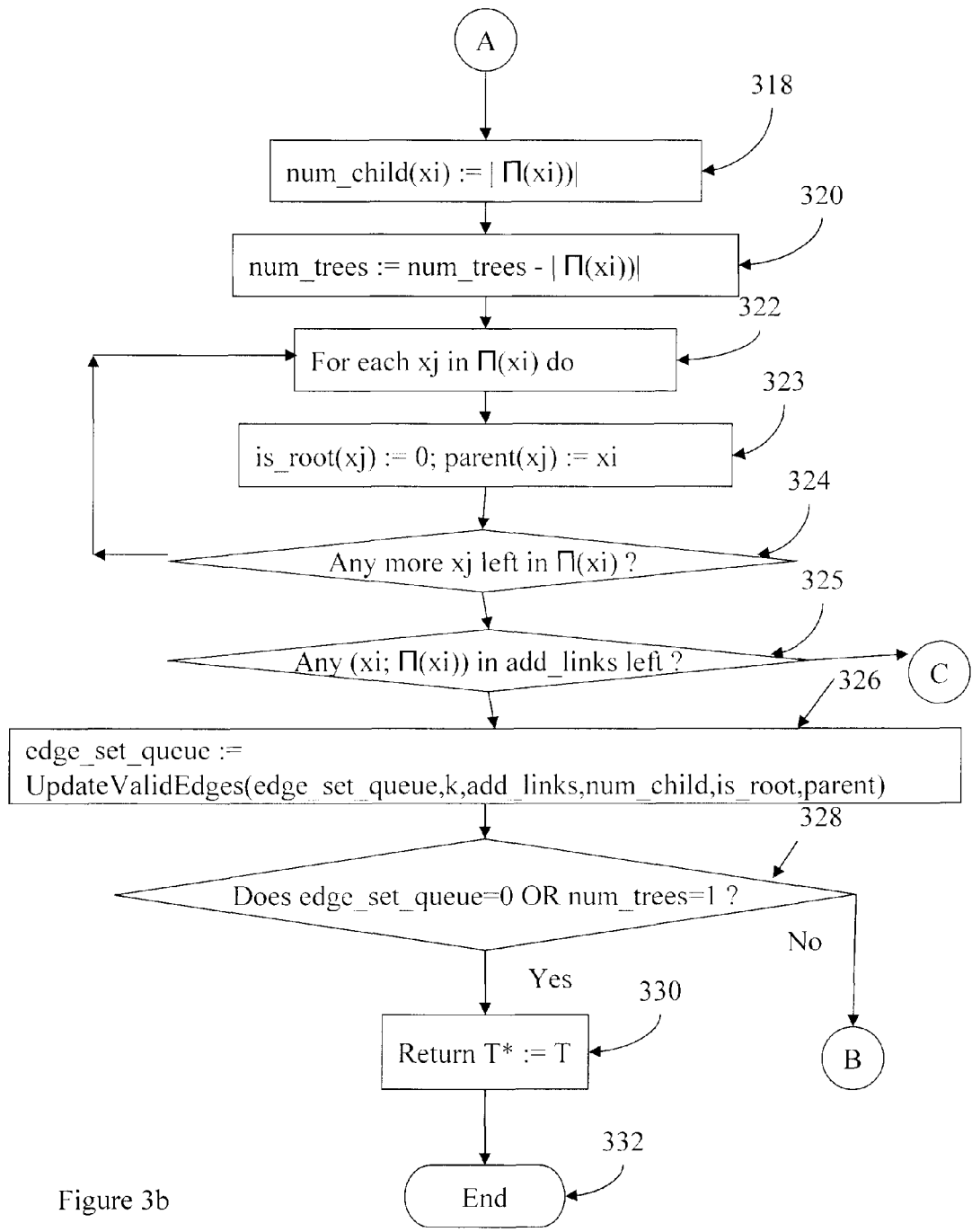

FIGS. 3a and 3b show a flowchart of an exemplary method in accordance with the present invention. The method starts at step 302 and continues to step 304 where the inputs are received. In this example, the inputs include the nodes of the reverse Bayesian forest, the constraint set, the cost function, and the maximum out-degree. The method continues to step 306. In step 306, the exemplary embodiment of the present invention constructs, in a GenerateSortedQueue routine, a sorted queue of all negative cost edge-sets. Specifically, step 306 sorts edge-sets in the queue in an ascending order of their net contribution to the quality cost function defined above so that the Top function retrieves the best or the minimum cost element of the queue. The construction of the queue is followed, by steps 308 and 310, where the forest T and certain properties of the nodes, e.g., is-root, num-child are initialized. This is in turn followed, in steps 312 and 314, by repeated additions of the best possible edge-sets until there are no eligible edge-sets or T is a single tree, where an edge-set is "eligible" just in case it has a negative cost and does not violate the ordering constraints. Each addition of an edge-set also involves updating the properties of the constituent nodes, in Steps 316 through 325, and removing, in Step 326, all the members from the queue that become ineligible, e.g., those resulting in cycles, as a result of the addition. The routines can often be implemented efficiently given the choice of the cost function and maximum out-degree. Hence, their description is provided below, where the description is restricted to a particular choice of the cost function C and the upper bound on the node out-degree k.

Observe that an exemplary method in accordance with the present invention satisfies the following properties, P1, P2, and P3.

P1) The exemplary method always converges to a solution in a finite number of iterations.

To see that P1 holds, after each step in the method, there is a strict decrease in the number of trees and the method terminates only when there are no edge-sets that satisfy the specified constraints or the forest consists of a single tree. Hence, the method always converges in at most steps to a solution.

P2) The solution resulting from an exemplary method may be a forest of directed trees and belongs to the feasible set of the structure learning problem.

To see why P2 holds, observe that, in every iteration of the method, edge-sets that could potentially result in cycles are removed from the eligible queue. Hence, the final solution cannot contain any cycles and has to be a forest of trees. Further, the edges being added are taken from the queue that is known to satisfy the constraints in as well as retain root status. Hence, the result of the exemplary method also satisfies the specified constraints, i.e., it is in the feasible set of the structure learning problem.

The following describes an exemplary embodiment of the present invention for cases where all the variables take continuous real values, and it is reasonable to assume that the joint probability density can be approximated as a multivariate Gaussian distribution and conditional probability densities correspond to linear Gaussian models. For this special case, a scoring criterion is derived using a minimum description length principle (MDL) and then the optimal Bayesian network can be obtained using the approach described above.

According to the minimum description length principle, the optimal model is the one that requires a minimum number of bits for encoding the model, often referred to as the model description length, as well as the training data or the empirical distribution given the model, often referred to as the data description length. Therefore, using this principle, the "goodness" of a Bayesian network may be quantified as the sum of model description length and the data description length. Let T be any linear Gaussian network based on the nodes, $x1, \ldots, xn$. Since the probability model or the joint probability distribution corresponding to T is given by:

$$pT = \Pi_i p(xi | \pi(xi)) \quad (6)$$

where $\pi(xi)$ are the Bayesian parents of $xi$.

The model description length can be split into two parts: (i) the number of bits that are required to specify the parents of each node, and (ii) the number of bits that are required to specify the conditional probability distributions. Let ki be the number of parents of node xi. Then, the first part of the model description length is given by $\Sigma_i$ ki $\log_2(n)$. Further, since T corresponds to a Bayesian network with linear Gaussian models, the conditional distributions have the form:

$$P(xi | \pi(xi)) = N(ai + \Sigma_{xj \in \pi(x)} bj * xj, \sigma_i^2) \quad (7)$$

where the linear coefficients bj, mean ai, and variance $\sigma_i^2$ are fixed for each variable xi.

Assuming that each of the above parameters requires a fixed number of encoding bits b, the second part of the model description length is given by:

$$\Sigma_{i=1}(2 + ki)b \quad (8)$$

Hence, the total model description length for a linear Gaussian network is given by:

$$2nb + \Sum_{i=1} ki(b + \log_2(n)) \quad (9)$$

For estimating the data description length, the fact that the number of bits required to encode each data record given the model approaches the sum of the entropy of the empirical distribution and the cross entropy of the model distribution with respect to the empirical distribution when the number of data records tends to infinity may be used.

Let m be the number of data records. The data description length can be written as:

$$-\Sum_i \log(pT(xi))] \quad (10)$$

where the summation is over the input data.

Some algebraic manipulation illustrates that the above is equivalent to:

$$m\Sum_i [H(pT(xi)) - I(xi;\pi(xi))] \quad (11)$$

where the mutual information I(.;.) and H(.) are empirical estimates, namely they involve expectation over input data.

When the conditional density parameters are estimated using the maximum likelihood principle, the term H(pT(xi)) turns out to be invariant across the different networks, hence the cost function for each candidate network may be written as:

$$J(T) = \Sum_{i=1} ki(b + \log_2(n)) - mI(xi;\pi(xi)) + (2nb + \Sum_i H(pT(xi))) \quad (12)$$

where the summation is over all the terms of pT.

The above cost function can be further simplified by ignoring the invariant terms $(2nb + \Sum_i H(pT(xi)))$ and writing the mutual information terms in terms of covariance matrices by noting that:

$$I(xi;\pi(xi)) = H(pT(xi))) + H(pT(\pi(xi))) - H(pT(xi,\pi(xi))) \quad (13)$$

Which for Gaussian variables reduces to:

$$(\tfrac{1}{2})(1 + \log((|\Sigma_{xi}|*|\Sigma_{\pi(xi)}|)/(|\Sigma_{xi,\pi(xi)}|))) \quad (14)$$

where $\Sigma_x$ denotes the covariance matrix of x.

It is straightforward to see that the resulting minimum description length score may be decomposed as the sum of contributions of the causal relations at each node, namely:

$$J(T) = \Sum_{i=1} ki(b + \log_2(n)) - (m/2)(1 + \log((|\Sigma_{xi}|*|\Sigma_{\pi(xi)}|)/(|\Sigma_{xi,\pi(xi)}|))) = \Sum_{i=1} C(xi,\pi(xi)) \quad (15)$$

The above scoring criterion concretely defines a cost function used in an exemplary embodiment of the inventive method. Now to solve this concrete instantiation of the problem, the optimal structure for the Bayesian network needs to be found such that the cost function as defined in equation (15) is minimized and the parameters of the corresponding conditional distributions assuming linear Gaussian models needs to be estimated. The latter problem, i.e., that of estimating the conditional distribution parameters for term corresponding to xi, is exactly equivalent to a linear regression problem where xi is the dependent variable and $\pi(xi)$ are the independent variables. In particular, $b_i$ are the regression coefficients, $a_i$ is the constant term and $\sigma_i^2$ is the empirical variance of xi. Since there are known methods to efficiently solve linear regression, the following mainly focuses upon the structure learning problem.

The following describes how the structure learning method that is illustrated in FIGS. 3a and 3b may be applied to the special and concrete case of linear Gaussian networks. In particular, the following concentrates on efficient implementations of the routines for the cost function and maximum out-degree k=2. Choosing the maximum out-degree to be 2 limits the expressive power of the network since the search set now only consists of forests of reverse binary trees, but it improves the computational complexity to a great extent.

For an exemplary choice of k, there are only three possible types of edge-sets:

1) single edges of the form (x,y), where x is the parent and y is the child;
2) pairs of edges of the form ((x,y),(z,w)), where y and z are already connected; and
3) V-structures of the form ((x,y),(x,z)), where x is the parent and y, z are the children.

In order to be eligible for inclusion into the existing forest, the edge-sets must satisfy all the following criteria:

A) Ordering Constraints: The final solution cannot contain any of the edges in S, the input ordering constraints. Therefore, only the edge-sets that do not contain any edges in S are eligible.

B) Negativity Constraints: An edge-set improves the quality of the existing configuration only if its contribution to the overall cost function is negative. Therefore, there is only a need to consider edge-sets with negative costs. For scoring criteria such as likelihood, this is true for all the edge-sets so that the resulting solution (assuming S permits a tree) is always a single tree. However, for the minimum description length score, in general only a subset of the edge-sets is eligible, resulting in a reduced computational effort. Letting b'=(log n+b)/m, the negativity constraints, for the special case under consideration, translates to the following conditions:

For single edges (x,y), C(x;y)<0, or equivalently I(x,y)>b' is required.

For a pair of edges ((x,y),(z,w)), C(x;y)+C(z;w)<0, C(x;y)<0, and C(z;w)<0, i.e. I(x,y)+I(z,w)>2b', I(x,y)>2b', I(x,y)>2b' is required.

For a V-structure, ((x,y),(x,z)), C(x;y,z)<0, C(x;y)<0, and C(x;z)<0, i.e. I(x;y,z)>2b', I(x;y)>2b', and I(x;z)>2b' is required. Noting that $I(x;y,z) \leq I(x;y) + I(x;z) - I(y;z)$, only triplets for which I(x;y)+I(x;z)-I(y;z)>2b' need to be considered, resulting in some further computational savings.

C) Merging Constraints: Since each merger involves connecting smaller trees to obtain a larger tree, the child node in each edge of an edge-set has to be the root of some tree. In case of an edge pair, the child node of the first edge and the parent of the second edge need to lie in the same tree. Further, the parent node in each case should not exceed the maximum out-degree due to the addition of the edges. Only edge-sets whose edges satisfy all the above conditions are eligible for inclusion into the tree. Unlike the other types of constraints, the merger constraints depend on the current (run-time) configuration of the algorithm.

The following describes an exemplary GenerateSortedQueue sub-routine.

Using the different eligibility criteria for the edge-sets described above, the exemplary routine can be efficiently implemented as follows:

1) Identify all the edges (i.e. ordered node pairs) that satisfy the ordering constraints, and insert them into the queue Q2A.
2) Compute the mutual information values for all the pars in Q2A.
3) Identify edges with negative costs and create sub-queues Q2B(xi) of edges with the same child node, xi, that are sorted by the associated costs.
4) Form eligible V-structures by picking each edge from the Q2B sub-queues and combining it with another edge in the same sub-queue but with higher cost. Among all these structures, identify the ones with negative lower bounds on the cost function, and for the Q3A queue, namely:

$$Q3A \leftarrow \{((xi,xj),(xi,xk)) | (xi,xj),(xi,xk) \in Q2B(xi); C(xi; xj) + C(xi;xk) + I(xj;xk) < 0; j \neq k\} \quad (16)$$

5) Compute the exact mutual information $I(xi;xj,xk)$ for all the V-structures $(xi;xj,xk)$ Q3A, and set the associated cost as follows:

$$C(xi;xj,xk) \leftarrow 2b' - I(xi;xj,xk) \quad (17)$$

6) Identify V-structures with negative costs and sort them based on the cost.

7) Merge the sorted queues Q2B(xi) of edges for all nodes xi and Q3B of edges and V-structures to form Qall.

8) Create reverse indices from each node to the edge-sets containing it as child node and parent node, i.e.:

$$Rall(xj) \leftarrow \{(xi,xj) | (xi,xj) \in Q2B(xi), 1 \leq i \leq n\} \quad (18)$$

$$Rall(xj) \leftarrow Rall(xj) U\{((xi,xj),(xi,xk)) | ((xi,xj),(xi,xk)) \in Q3B\} \quad (19)$$

$$Fall(xi) \leftarrow Q2B(xi) U\{((xi,xj),(xi,xk)) | ((xi,xj),(xi,xk)) \in Q3B\} \quad (20)$$

In the above procedure, Step 5 has the highest computational complexity since, in the worst case, Q3A could include all possible triplets and the mutual information for all of them may need to be evaluated, which would require $O(n^3 m)$ computational time, where n is the number of variables and m is the number of records. However, in practice the number of eligible structures in Q3A would be expected to be much lower than $O(n^3)$. In general, the computational time is dependent on the sizes of the various queues, which in turn are determined by the dependencies between the variables.

An UpdateValidEdges sub-routine in accordance with an exemplary embodiment of the present invention is now described. Since the merging constraints change as the method progresses, edge-sets need to be removed and added to the eligible queue after each merger. In particular, the inclusion of an edge-set e changes the root status of nodes that are children in e. So all other edge-sets that contain these nodes as children become ineligible for inclusion.

Further, due to the limits on the out-degree, some of the edge-sets corresponding to parent nodes in the included edge-set e might also become invalid. The addition of an edge-set also creates new connected components and hence, new eligible link pairs. In particular, the addition of an edge-set containing (x,y) allows link pairs of the form ((u,v),(y,z)) to be added, where v is the current root of the tree containing x, u is an eligible parent (i.e., out-degree<k) and z is root of some tree. However, since the ordering and cost constraints may need to be satisfied, only pairs of edges that are already in the eligible queue are considered.

Based on the above discussion, an exemplary embodiment of the method may be implemented as follows (assuming e is the edge-set that was added in the previous step):

For all $(xi,xj) \in e$,

A) remove all the edge-sets containing a child node, i.e., remove all edges-sets containing xj as parent node from Qall;

B) If num_child(xi)=2, remove all structures containing xj as parent node from Qall;

C) If num_child(xi)=1, remove all V-structures containing xi as parent node;

D) Obtain root of the tree containing xi, xi0=Root(x);

E) Identify edge pairs that have become eligible due to (xi,xj), namely:

$$Q4B = \{(x1,xi0),(xj,xk)\} | (x1,xi0),(xj,xk) \in Qall\}. \quad (21)$$

Then compute the associated costs of the edge pairs and add them to the sorted eligible queue, i.e.:

$$Qall = Qall U Q4B \quad (22)$$

In the above sequence of steps, the routine Root may be implemented by successively following the parent function. The removal of the edge-sets may be accomplished efficiently by storing a valid/invalid bit for each edge-set and modifying this as desired. This ensures that the computational effort for removing the edge-sets is independent of the actual size of the queue. The computational time for the addition of edge-sets, however, depends on the size of Qall and is in particular, given by |Q4B| log(|Qall|). Since each edge-set can have at most two edges and the number of edge-sets associated with each node can at most be $O(n^2)$, the worst-case computational complexity of this routine is $O(n^2 \log(n))$.

Since the method illustrated by FIGS. 3a and 3b may have at most n−1 iterations, the overall computational complexity of the method is given by $O(n^3 m + n^3 \log(n))$, where m is the number of records and n is the number of variables. This is a feasible amount of computation time, for reasonably large values of n and m that are likely to appear in real world applications of the embodiments of the present invention.

Figure 4:
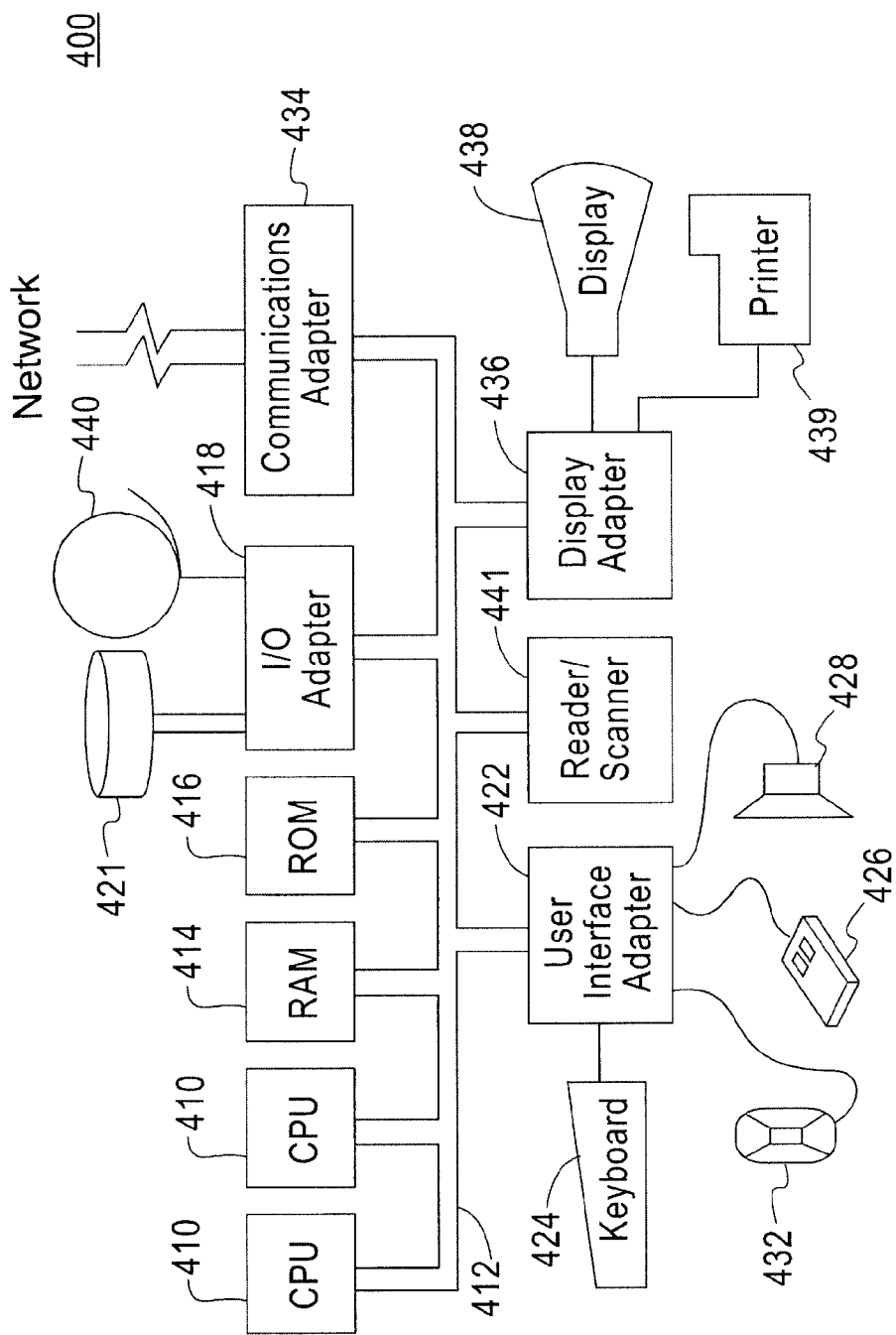
FIG. 4 illustrates a typical hardware configuration 400 which may be used for implementing the inventive system and method for causal modeling and outlier detection.
Figure 5:
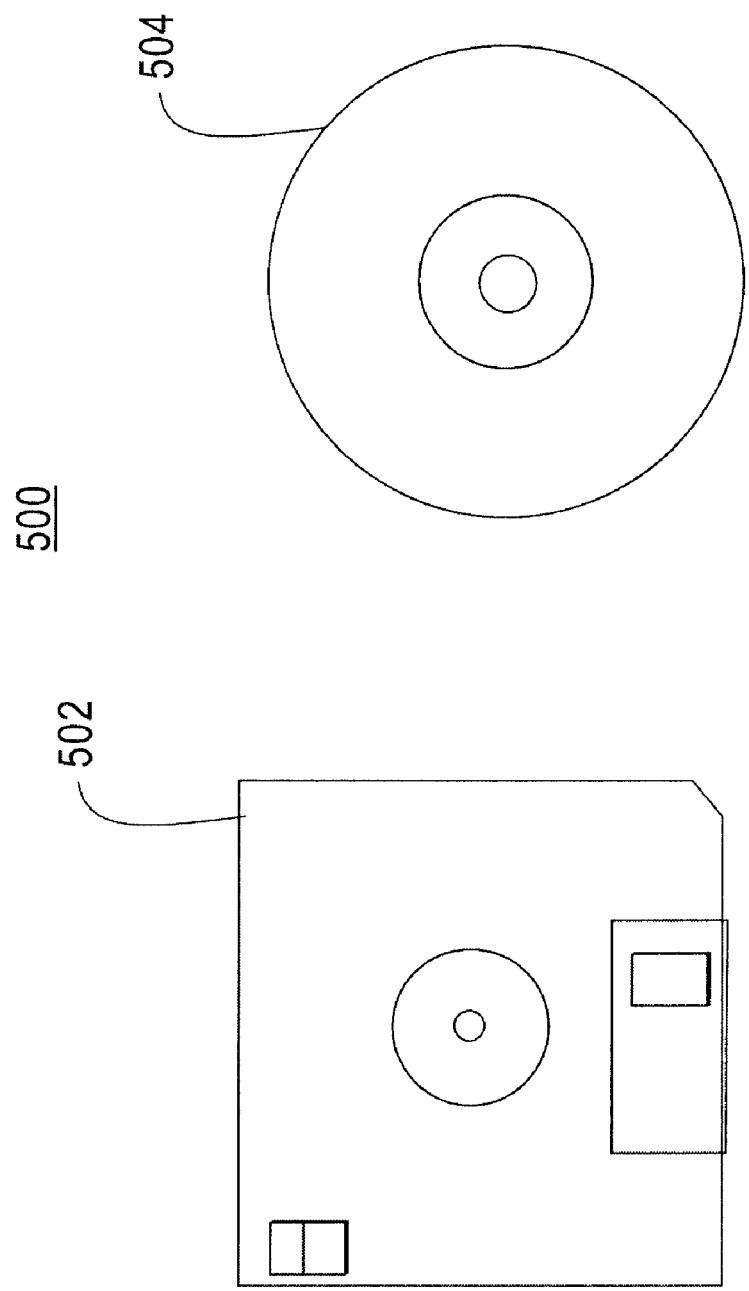
FIG. 5 illustrates exemplary signal-bearing media 500 tangibly embodying a program of machine-readable instructions executable by a digital data processor to perform the inventive method.

Referring now to FIG. 4, system 400 illustrates a typical hardware configuration which may be used for implementing the inventive system and method for causal modeling and outlier detection. The configuration has preferably at least one processor or central processing unit (CPU) 410. The CPUs 410 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting to a data processing network, the Internet, and Intranet, a personal area network (PAN), etc., and a display adapter 436 for connecting the bus 412 to a display device 438 and/or printer 439. Further, an automated reader/scanner 441 may be included.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 410 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 410 and hardware above, to perform the method of the invention.

This signal-bearing media may include, for example, a RAM contained within the CPU 410, as represented by the fast-access storage for example. Alternatively, the instructions may be contained in another signal-bearing media, such as a magnetic data storage diskette 502 or CD-ROM 504, (FIG. 5), directly or indirectly accessible by the CPU 410.

Whether contained in the computer server/CPU 410, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may comprise software object code, compiled from a language such as "C," etc.

An exemplary embodiment of the present invention may be incorporated into an existing system, such as International Business Machine Corporation's (Hereinafter "IBM") Fraud and Abuse Management System (hereinafter called: "FAMS"). This embodiment may integrate the inventive method for estimating of a reverse Bayesian forest via the graphical user interface of FAMS system, through which a user may instruct the system to estimate a reverse Bayesian forest model for the input data, and then optionally to perform outlier detection on a possibly distinct data set.

This exemplary embodiment of the present invention may be fed as input data set includes features that characterize the entities for which fraud detection is being performed. For example, in medical fraud detection, features may be quantities that characterize a medical provider, such as "the total number of procedures applied by the provider," or "the total number of claims filed by the provider."

This exemplary embodiment of the present invention may feed outliers, their outlier scores and violated "root cause" feature dependencies back to a parent system, such as the FAMS system, for subsequent processing. The parent system may, for example, display the outliers flagged by the inventive method and the associated outlier scores, as well as the responsible root cause feature relations. An example of such information display 600 is given in FIG. 6. In this list, the top row 602, which is encircled, corresponds to the provider that was judged by the exemplary embodiment of the present inventive method to be the "top" outlier.

The table of results 600 in FIG. 6 is for a fraud and abuse management system as applied to data in a medical insurance system. In such an application, the fraud and abuse management system characterizes the behavior of providers by first creating a vector of features for each provider, including, for example, such quantities as the number of claims submitted and the total number of procedures performed, and then applying statistical methods such as the present invention on the profiles. In the table 600 of FIG. 6, the first column exhibits the ID numbers of the entities, in this case, provider ID numbers. The second column shows the negative log likelihood given by the model estimated in accordance with an exemplary embodiment of the present invention. The negative log likelihood may be interpreted to be an "outlier score." The third column contains the top root cause feature dependency for the "flagged" outliers. Here the providers included in the top outliers list can be interpreted to be "flagged" as outliers, since by inclusion into the list of top outliers, a determination has been made that those providers included in the list are the outliers of interest, according to some, possibly arbitrary, threshold on the outlier score to determine the inclusion in the list. Those skilled in the art will understand that the method is not limited to showing one root cause per outlier, or any other number. Such information may help automate the selection of entities, such as medical providers, and their associated "root cause" features to visually inspect, out of tens and hundreds of features, and thousands of providers, by using visualization functions available in the parent system.

Figure 7:
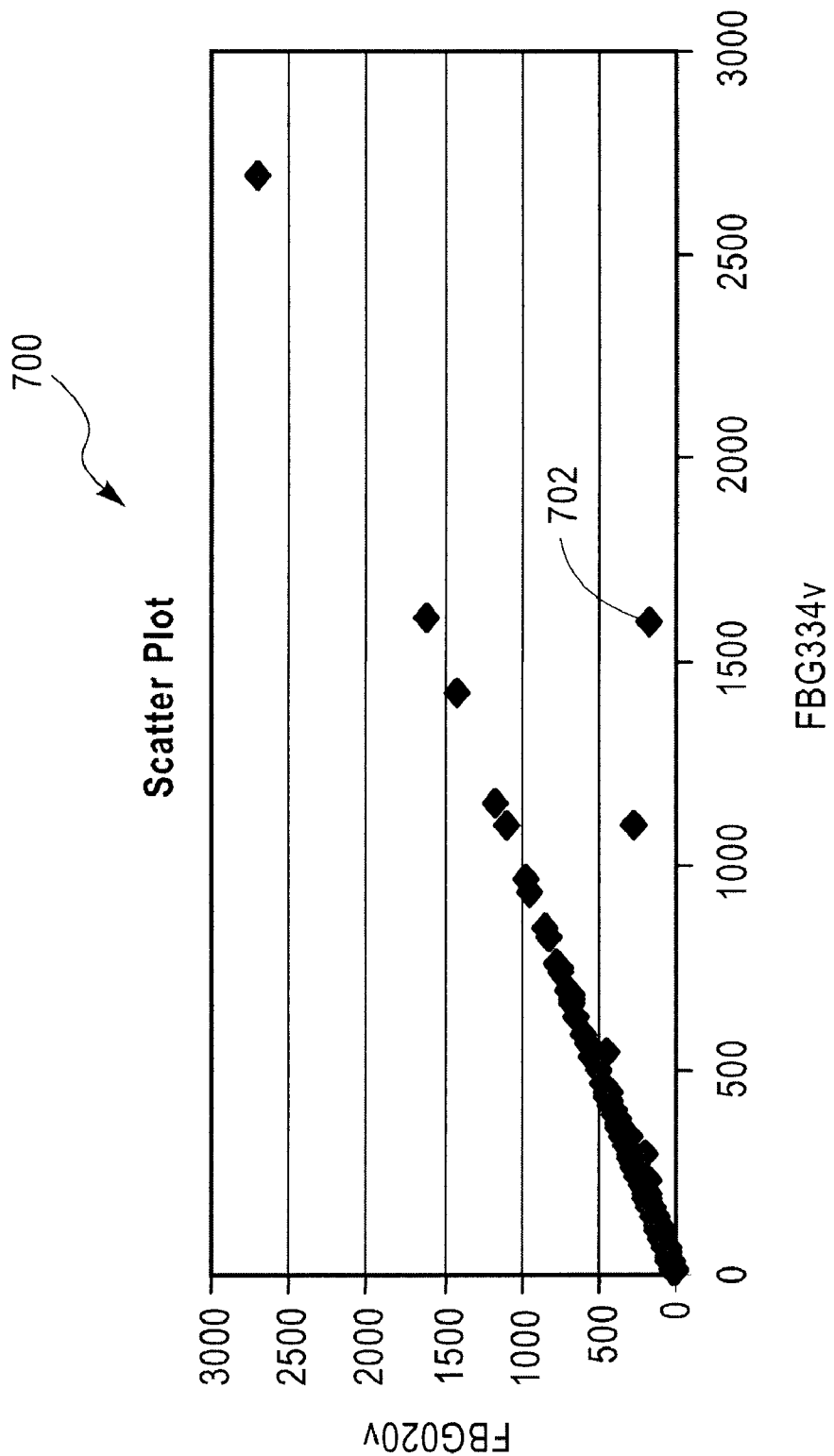
FIG. 7 is a "scatter plot" graph 700 of the root cause feature values for the top outlier in the list 600 of outliers shown in FIG. 6, in accordance with an exemplary embodiment of the present invention.

FIG. 7 illustrates a plot 700 which was generated by plotting the values of two features specified as "root cause" features of why a provider at the top of an output outlier list, similar to the one shown in FIG. 6, was flagged as outlier. In the graph, the X-axis represents the value of "FBG020v" feature, which stands for the number of procedures applied by the provider in question, and the Y-axis represents the value of "FBG334v", which stands for the total number of claims submitted by the provider. Each dot in the graph corresponds to a provider, and its associated x and y values represent the FBG020v and FBG334v feature values for the provider in question. The provider 702 with the highest outlier score given by the exemplary embodiment of the present invention is apparent in FIG. 7 because the correlation that normally exists between the total number of claims and that of the procedures is severely violated by this particular provider 702. Such information is critical in assessing the likelihood that a provider 702 is indeed suspicious from the view point of fraud detection.

An exemplary embodiment of the present invention may be applied to, for example, detecting tool anomalies by analyzing tool data of tools that are used to manufacture manufacturing semiconductor devices.

Leading-edge semiconductor manufacturing processing is costly, highly complex, and the equipment often operates subject to very tight controls and narrow processing windows. In order to maintain and increase yield, manufacturing engineers need the capability to monitor the processing and to determine the root cause of a yield detractor as soon as it happens so as to reduce the risk of producing bad parts.

For example, by plotting time slides of an "inline electrical test yield vs. process lot ID by individual process tool ID," a user may identify the process tool ID of a low yielding lot and perform a root cause analysis in accordance with an exemplary embodiment of the present invention. For example, an exemplary embodiment may process data relating to good yielding lots to create a model and analyze the process data of low yielding lots for root cause analysis.

In a different application scenario, an exemplary embodiment of the present invention may be applied to detect anomalies in semiconductor processing in real time. This shortens the amount of time required to detect problems from days to minutes. Conventionally, the detection of such anomalies required days of inline electrical testing. The present invention greatly reduces the risk of production yield loss. For example, process data can be collected on every wafer during the wafer processing, analyzed at the end of the process with the exemplary embodiment of the present invention, which then may generate a wafer health-index based on an output log-likelihood value. The present invention makes it possible to implement such a real-time anomaly detection function in real manufacturing facilities.

An exemplary embodiment of the present invention may be applied on multi-variate time series data taken off of various types of tools in a complex chip manufacturing process. In such an application, the multi-variate time series data may include multiple records of data that are readings of various parameters of a tool of interest, each corresponding to a particular sampling time step. Each record may include multiple fields, each of which may be a reading of a particular parameter of a tool, such as, for example, a temperature, a pressure or other physical readings of a chamber in the tool, or other chemical or physical characteristics of that tool.

An exemplary method in accordance with the present invention may be applied to this problem, by forming temporal variables for each of these parameters, in such a way that there are multiple variables corresponding to each parameter X. For example, these variables may be X(0) through X(k), where X(t) represents the value of X at t time steps prior to a sampling time step. The newly created temporal data set will then include values for X(0) through X(k) for each parameter X in the original time series data, and for each time step between 0 and T−k, where T is the number of time steps or records included in the original data set. By appropriately determining k or the window size, it is possible to capture temporal dependency present in the time series data that are within k time steps apart, as dependency between variables present in the same record in the newly formulated temporal data set. An exemplary method in accordance with the present invention may then be applied to this newly created data set, and outlier time steps and their associated root cause variables may be output. This information may then be used to determine the time steps at which the tool has exhibited some unexpected behavior, together with information on what parameters may be potential root causes of such behavior.

The following describes the application of an exemplary embodiment of the present invention to determining the root cause of anomalies in "Reactive Ion Etching" (hereinafter referred to as "RIE") tools in a semiconductor manufacturing process. RIE is a process where a plasma of a reactive species is used to etch (remove) a thin film. The reactive species in this plasma emit light of certain wavelength that may be spectrally analyzed to monitor the Reactive Ion Etching process.

Input data for this exemplary application includes time series data of various measurements from a spectral analysis system. Measurement variables include, for example, OESBasisFunction1Value, IBVALUE1, IBVALUE2, IBVALUE3, IBVALUE4, IBVALUE5, PM1IBVALUE6, ESCClampVoltageMonitor, HeliumBacksideFlow, and HeliumPressureFlowAI. Here, IBVALUE 1 to 6 are specific spectrum channels, which correspond to the wavelengths that may be used to monitor a RIE reaction. During processing, the signal intensity of these channels may be monitored and collected as time-series data.

The input data to the exemplary embodiment of the present invention may include the temporal versions of these variables, such as, for example, OESBasisFunction1Value_t0, IBVALUE1_t0, IBVALUE2_t0, IBVALUE3_t0, IBVALUE4_t0, IBVALUE5_t0, PM1IBVALUE6_t0, PM1ESCClampVoltageMonitor_t0, HeliumBacksideFlow_t0, HeliumPressureFlowAI_t0, OESBasisFunction1Value_t0, HeliumBacksideFlow_t0 HeliumPressureFlowAI_t0 OESBasisFunction1Value_t1, IBVALUE1_t1, IBVALUE2_t1, IBVALUE3_t1, IBVALUE4_t1, IBVALUE5_t1, IBVALUE6_t1, ESCClampVoltageMonitor_t1, HeliumBacksideFlow_t1, HeliumPressureFlowAI_t1.

Figure 8:
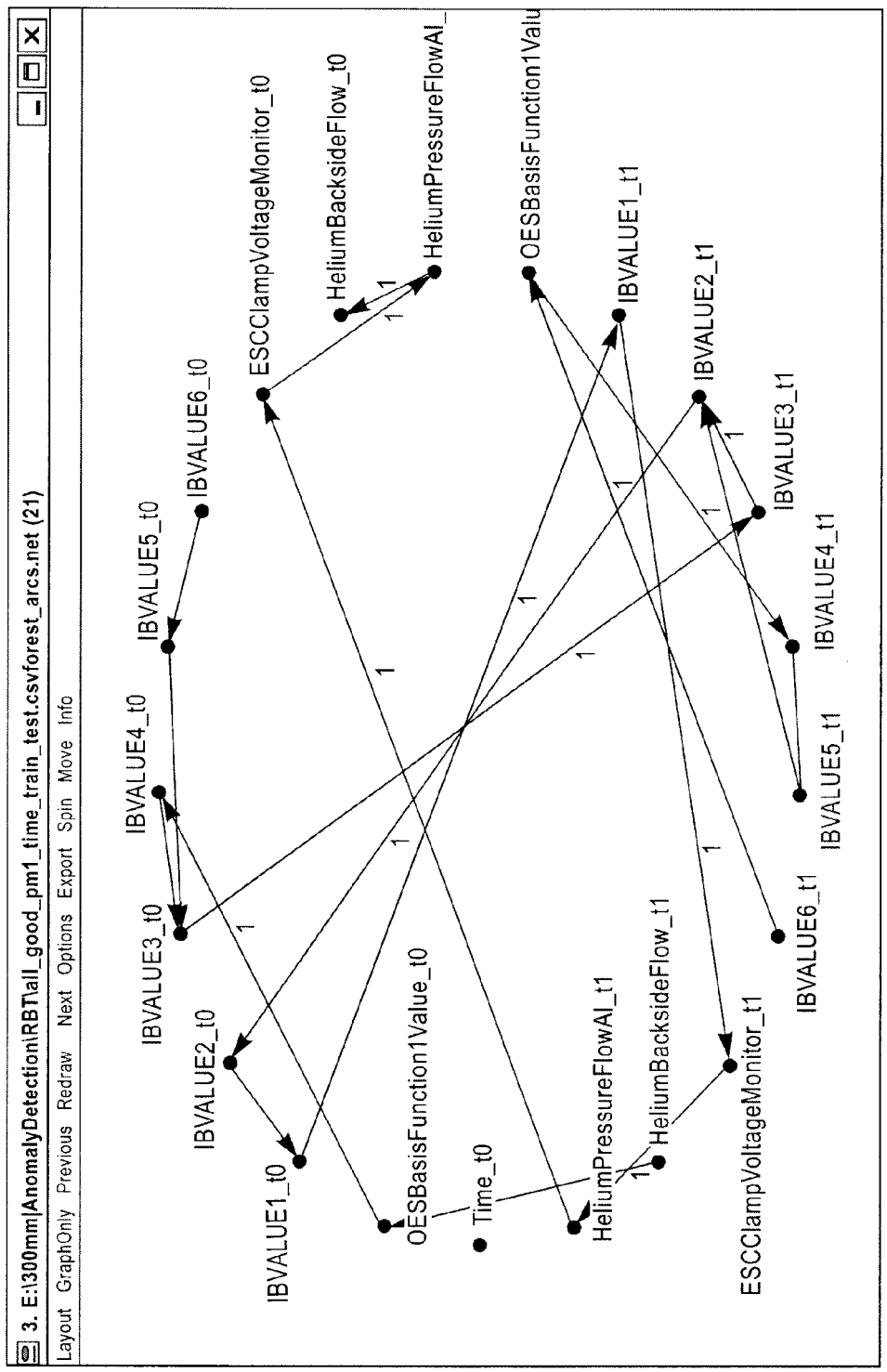
FIG. 8 is a graphical representation 800 of an output Reverse Bayesian Forest model for a tool anomaly detector for a semiconductor manufacturing processes in accordance with an exemplary embodiment of the present invention.

FIG. 8 illustrates a plot 800 of an exemplary Reverse Bayesian Forest that is generated by an exemplary embodiment of the present invention applied to the RIE anomaly data described above. The plot 800 is a visual representation of the structure of the estimated Reverse Bayesian Forest model for the given data. The estimation method of the present invention has made the determination that the underlying distribution of the input data can be characterized by the combination of linear Gaussian models for those feature combinations that are present as edges in this graph. Accordingly, the root cause features that are displayed in the list of outliers will be limited to those feature combinations that are present in this graph.

Figure 9:
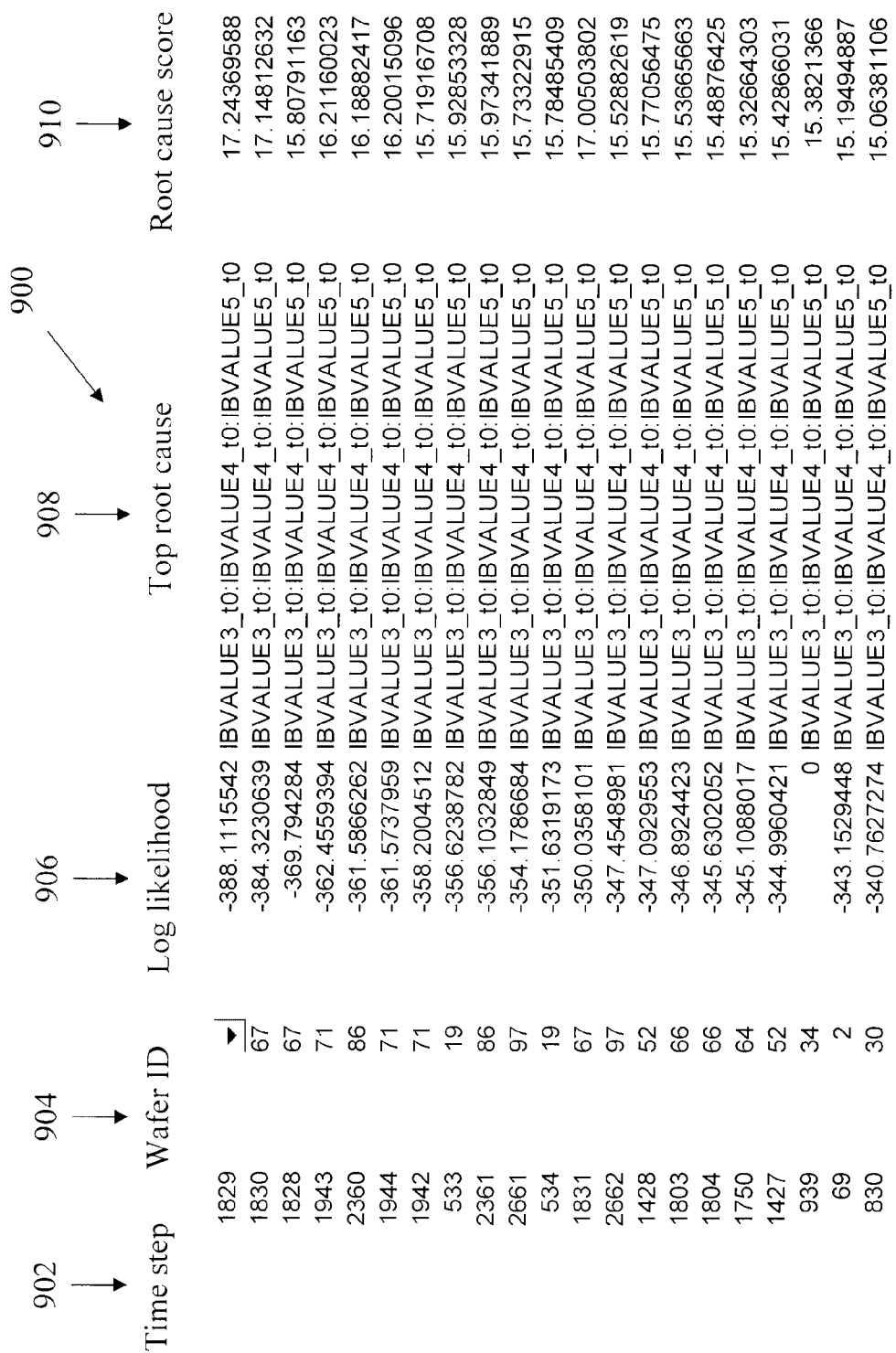
FIG. 9 is an output list 900 of outlier time steps and wafers and their associated root causes for a tool anomaly detector for a semiconductor manufacturing processes in accordance with an exemplary embodiment of the present invention.

An output model may be applied to a separate test set to flag outliers and their associated root causes. For example, an output model may be fed a test data set containing time series data corresponding to a number of wafers, which were known to have some problematic features, but whose root causes were unknown. An example of such an output list of outliers 900 and their root causes is shown in FIG. 9. This list includes a small number of time steps having the highest outlier scores, and hence all of them in the list have been judged to be outliers, up to some varying degrees. The columns in table 900 include a time step 902, a wafer ID 904, a negative log likelihood 906 that is output by the model, a top ranked root cause feature dependency 908, and a score associated with the top root cause. 910. The score given to a root cause 910 may be a statistic such as, for example, a number of standard deviations away from a mean based upon an associated conditional density model for a corresponding feature dependence. FIG. 9 illustrates that a candidate for a critical root cause is the violation of correlation that is typically observed between the IBVALUE2, IBVALUE3, and IBVALUE5, by the inclusion of this feature combination as the root cause for all of the top outliers. Interestingly, one of these variables, IBVALUE5 in particular, is unique to one of the steps in an RIE tool process called the "overetch" step, which has a different chemistry than the others and which has been identified at a later date by a process engineer as a likely root cause of problems.

In comparison, conventional commercial software products for tool anomaly detection, which are largely based on the conventional technique of Principal Component Analysis have failed to flag this particular process step as the likely root cause of a problem. This application of an exemplary embodiment of the present invention, therefore, provides clear advantages over conventional systems. This exemplary embodiment provides useful and otherwise unavailable information on root causes of tool anomalies, when applied in the context of tool anomaly detection and diagnosis in semiconductor manufacturing processes.

Figure 10:
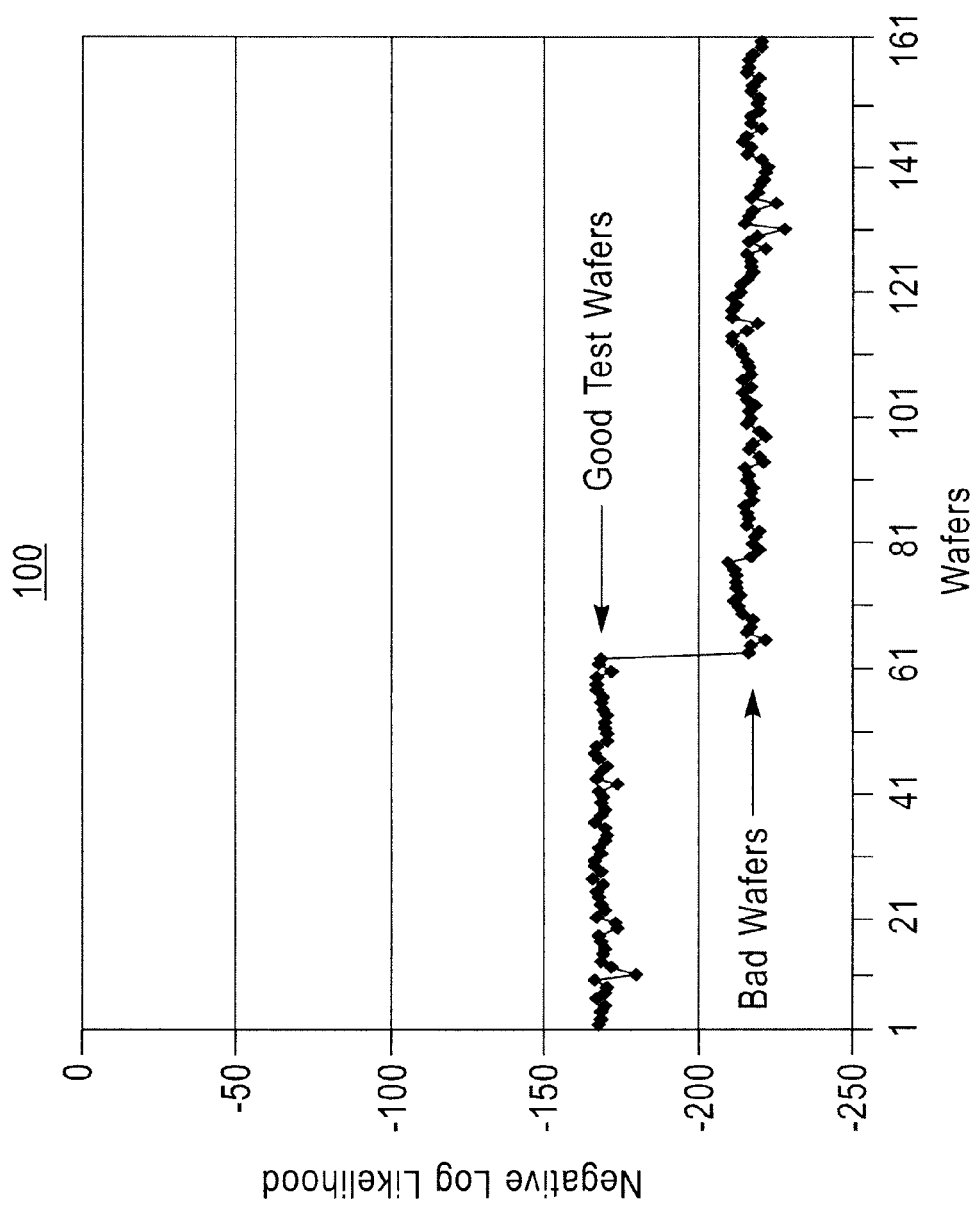
FIG. 10 is a graph 1000 of negative log likelihood scores given by a Reverse Bayesian Forest model on a test data set that includes data for both normal and defective wafers in accordance with an exemplary embodiment of the present invention.

When an exemplary embodiment of the present invention is applied for near real time tool anomaly detection, it may be important that the negative log likelihood value that is output on each wafer accurately indicates whether or not the wafer in question is likely to have a problem, or a suspicious behavior. The inventors performed an experiment to evaluate an exemplary embodiment using the RIE tool data described above. In this experiment a test data set, including of good wafers without known problems and with high eventual production yields, and another test data set including bad wafers with known problems and with low eventual production yields were fed to the exemplary embodiment. The embodiment provided negative log likelihood scores based on the Reverse Bayesian Forest model described above. FIG. 10 shows a plot 1000 of output negative log likelihoods along the y-axis, and wafer ID's along the x-axis in accordance with this exemplary embodiment. The wafer ID's are ordered in the plot 1000 so that the ID's of the good wafers come before those of the bad wafers. From the plot 1000, it is clearly seen that the negative log likelihood score is a good measure of whether a given wafer is problematic or not, at least in this case, since any threshold value between −180 and −210 for the score would perfectly separate the "good" wafers from the "bad" ones. This clearly illustrates that an exemplary embodiment of the present invention may be useful as a method of near real time tool anomaly detection in semiconductor fabrication processes.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method, implemented on a computer, for causal modeling, comprising:
   modeling, using the computer, a data set, said modeling comprising estimating a reverse Bayesian forest for the data set, said reverse Bayesian forest comprising a set of tree structures, wherein in each of said tree structures a direction of edges leads from a root of the tree structures towards leaves of the tree structures;
   detecting outliers in a separate data set, said detecting comprising:
      applying the reverse Bayesian forest to the separate data set to obtain a probability value assigned to data points in the separate data set; and
      identifying outliers in the separate data set by evaluating the probability value given by the reverse Bayesian forest; and
   determining the root cause of the outliers by searching for the outliers in the reverse Bayesian forest and determining root cause feature dependencies for the outliers.

2. The method of claim 1, wherein said identifying outliers comprises determining whether the probability value is lower than a predetermined threshold.

3. The method of claim 1, wherein said tree structures comprise a set of directed edges from a first set of variables to a second variable represents a conditional probability density of the second variable given the first set of variables.

4. The method of claim 3, wherein said conditional probability density is represented by a linear Gaussian model.

5. The method of claim 1, further comprising associating a model of unconditional density for leaf nodes of said reverse Bayesian forest.

6. The method of claim 1, wherein the reverse Bayesian forest comprises a single Bayesian network.

7. The method of claim 1, wherein said estimating the reverse Bayesian forest comprises estimating a structure of the reverse Bayesian forest and probability parameters associated with the Bayesian forest.

8. The method of claim 1, wherein said estimating a reverse Bayesian forest comprises determining a optimal model within a class of reverse Bayesian forests.

9. A computer system for causal modeling, comprising a computer processing apparatus, the computer processing apparatus comprising:
   a modeling unit configured to estimate a reverse Bayesian forest for the data set, the term—using the computer processing apparatus, said reverse Bayesian forest comprising a set of tree structures, wherein in each of said tree structures a direction of edges leads from a root of the tree structures towards leaves of the tree structures;
   a detecting unit configured to detect outliers in a separate data set by:
      applying the reverse Bayesian forest to the separate data set to obtain a probability value assigned to data points in the separate data set; and
      identifying outliers in the separate data set by evaluating the probability value given by the reverse Bayesian forest; and
   a determining unit configured to determine the root cause of the outliers by searching for the outliers in the reverse Bayesian forest and determining root cause feature dependencies for the outliers.

10. The computer system of claim 9, wherein said detecting unit identifies outliers by determining whether the probability value assigned is lower than a predetermined threshold.

11. The computer system of claim 9 wherein said tree structures comprise a set of directed edges from a first set of variables to a second variable represents a conditional probability density of the second variable given the first set of variables.

12. The computer system of claim 11, wherein said conditional probability density is represented by a linear Gaussian model.

13. The computer system of claim 9, wherein said detecting unit further associates a model of unconditional density for leaf nodes of said reverse Bayesian forest.

14. The computer system of claim 9, further comprising a storage unit storing training data,
   wherein the modeling unit estimates the reverse Bayesian forest based on the training data.

15. A non-transitory computer readable storage device embodying a program, executable by a digital processing system, for causal modeling and outlier detection, said program comprising:
   instructions for modeling a data set, said modeling comprising estimating a reverse Bayesian forest for the data set, said reverse Bayesian forest comprising a set of tree structures, wherein in each of said tree structures a direction of edges leads from a root of the tree structures towards leaves of the tree structures;
   instructions for detecting outliers in a separate data set, said detecting comprising:
      applying the reverse Bayesian forest to the separate data set to obtain a probability value assigned to data points in the separate data set; and
      identifying outliers in the separate data set by evaluating the probability value given by the reverse Bayesian forest; and
   instructions for determining the root cause of the outliers by searching for the outliers in the reverse Bayesian forest and determining root cause feature dependencies for the outliers.

16. The non-transitory computer readable storage device of claim 15, wherein said identifying outliers comprises determining whether the probability value is lower than a predetermined threshold.

* * * * *